Figure 1:
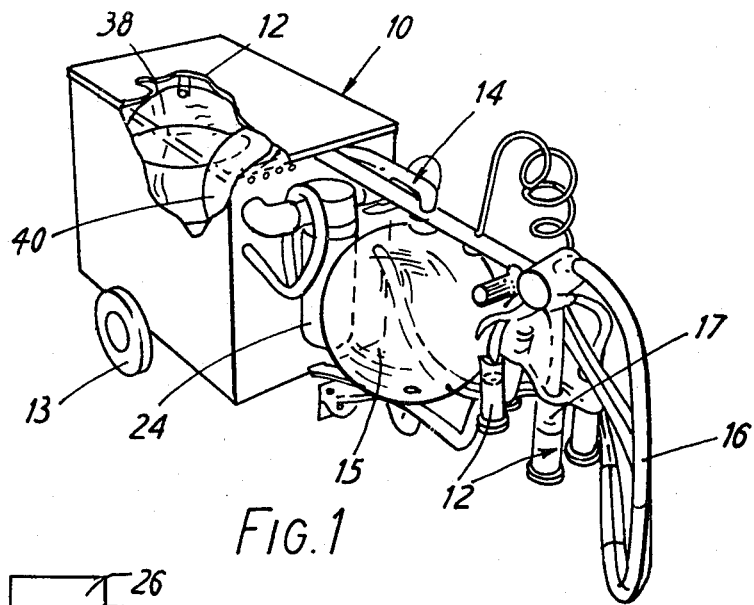

United States Patent [19]

Bennett

[11] 4,403,569
[45] Sep. 13, 1983

[54] MILKING MACHINE

[76] Inventor: Arthur J. R. Bennett, 65 Road No. 3, Victory Park, Johannesburg, South Africa

[21] Appl. No.: 335,372

[22] Filed: Dec. 29, 1981

[51] Int. Cl.³ .............................................. A01J 5/04
[52] U.S. Cl. ............................... 119/14.18; 119/14.01
[58] Field of Search ............... 119/14.11, 14.18, 14.46, 119/14.01

[56] References Cited

U.S. PATENT DOCUMENTS

| | | | |
|---|---|---|---|
| 3,385,265 | 5/1968 | Schrader | 119/14.18 |
| 3,461,845 | 8/1969 | Peterson | 119/14.18 |
| 4,168,677 | 9/1979 | Brown | 119/14.18 |

Primary Examiner—Hugh R. Chamblee
Attorney, Agent, or Firm—Murray and Whisenhunt

[57] ABSTRACT

A milking machine for milking one cow at a time and including a dry air pump 18 for providing high pressure and partial vacuum, a milk recording jar 15, a teat cluster 17, pulsating means 26, containers for wash liquid 38 and teat spray 40, tubing providing flow paths among these components and valves controlling the flow paths. The components are assembled as a unit on a mobile frame. The valves may be solenoid operated and may be controlled in groups to effect milking, milk transfer under pressure and pressurizing of the containers.

6 Claims, 3 Drawing Figures

MILKING MACHINE

This invention relates to a milking machine for milking cows.

Mechanical milking systems generally include a number of clusters of teat cups each for fitting to the teats of a cow, an outlet for milk from each cluster leading to a milk receiving means, such as a milk recording jar or milk outlet line, a pump providing a source of partial vacuum that is connectable to the teat clusters through each milk receiving means, a pulsator for intermittently allowing the partial vacuum to be applied to the cow's teats to milk the cow, tubing providing flow paths between the various components, and valve means controlling the flow paths. Means may also be provided for washing a cow's udder, and the components of the machine which come into contact with the milk, such as teat cluster, milk recording means and associated liquid lines. The washing means may include a cleaning liquid supply and compressed air means to blow out the cleaning liquid after flushing with the cleaning liquid. The compressed air may also be used to expel the milk from the milk accumulator. Examples of such machines are disclosed in South African Pat. Nos. 75/4703 and 76/4740 BENNETT. With these machines the vacuum and pressure lines are common and supplied from an external source and a leakage at one position may affect the whole system. The term "partial vacuum" means a pressure less than the prevailing atmospheric pressure.

According to the invention there is provided a milking machine comprising a frame and, mounted on the frame, means for providing sources of high pressure and partial vacuum, milk receiving means, a teat cluster, pulsating means, at least one container for cleaning liquid, tubing connecting these components and providing flow paths for high pressure, partial vacuum and milk, and valve means controlling the flow paths.

The machine may also have one or more of the following features. The frame may also support a housing in which most of the components of the milking machine are contained. The frame may be mounted on wheels. The pump means is preferably a single pump having a controlled inlet for providing a source of partial vacuum and a controlled outlet for providing a source of high pressure. The pump means is preferably a dry air pump. Preferably there are two containers for cleaning fluid and separate fluid connections to the containers, so that the containers may contain different cleaning fluids. A spray means may be connected to one or both of the containers. The pump means may be connected to the containers so that liquid can be drawn into each container and expelled therefrom by a suitable operation of the valve means. The valves may be solenoid operated valves which are preferably electrically connected to each other in groups, with each group being connected to a switch that controls the operation of the valves in that group. Preferably the groups of valves are connected to a three-position switch that controls the valves and has positions to effect, selectively: milking, milk transfer out of the milk receiving means and cleaning of the teat clusters and associated tubing. The milk receiving means may also be cleaned. The valves may be incorporated into a suitable multi-port valve unit, such as a suitable spool hand valve, which can be moved to control all the fluid lines simultaneously.

Figure 2:
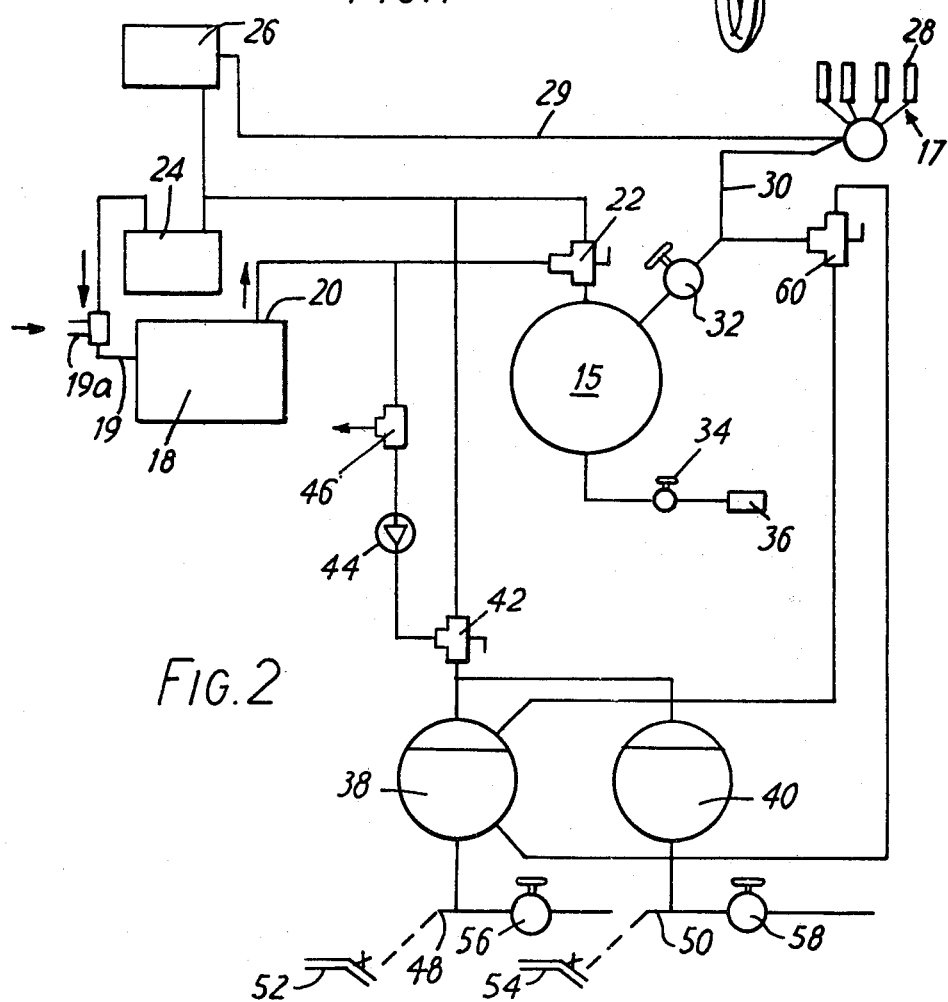
Figure 3:
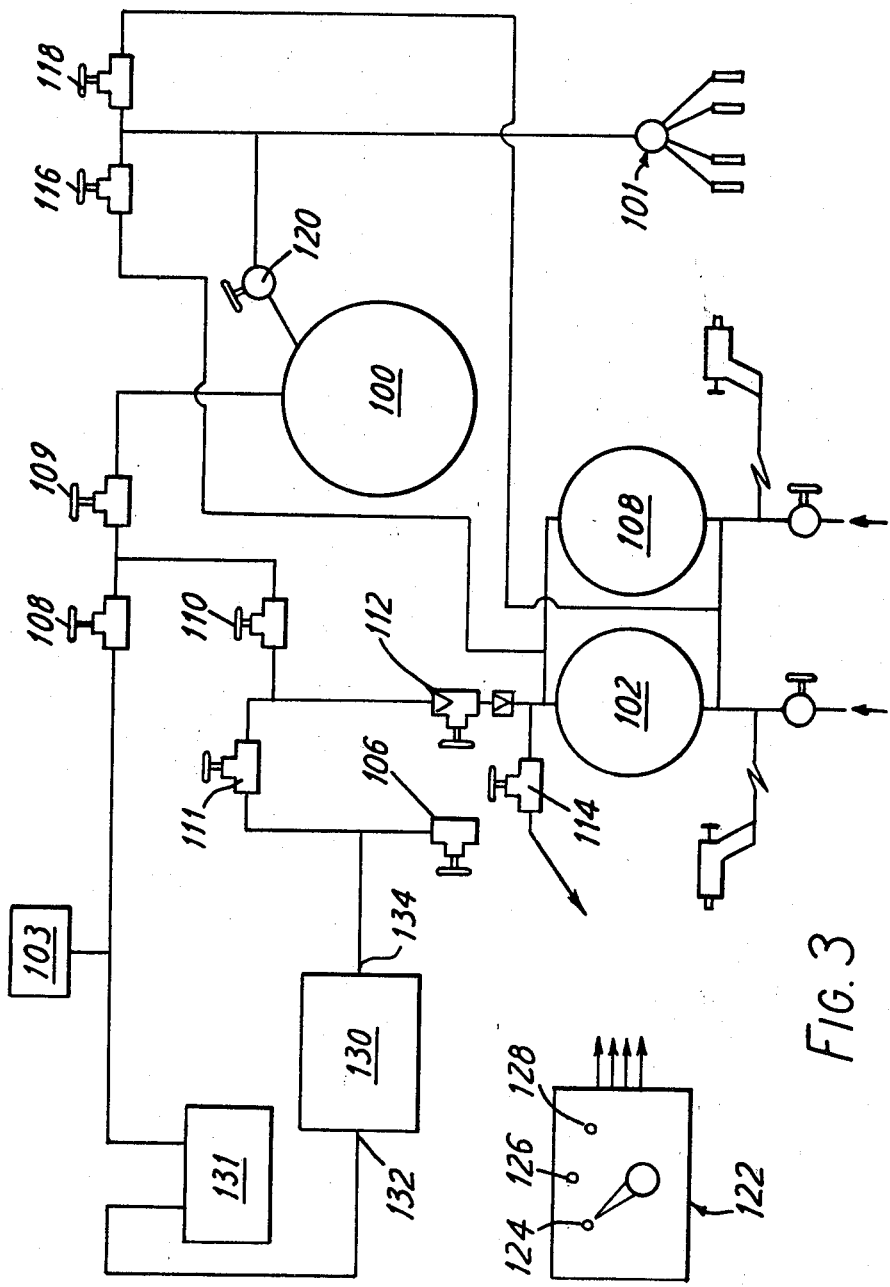

Embodiments of the invention are now described, by way of example with reference to the accompanying schematic drawings, in which:

FIG. 1 is a perspective, schematic view of a milking machine unit of the invention, parts being broken away to illustrate other parts more clearly, FIG. 2 is a schematic diagram of the components and fluid lines connecting them of the milking machine illustrated in FIG. 1, and FIG. 3 is a schematic diagram of the components and fluid lines connecting the components of another embodiment of milking machine of the invention.

FIG. 1 of the drawings shows a milking machine constructed as a mobile unit 10 that includes a housing 12 having a frame with an arm 14 extending therefrom, the housing being mounted on wheels 13. A milk recording jar 15 of spherical shape and a teat cluster 17 connected to the milk recording jar 15 by tubing 16 are supported on the arm 14 outside the housing 12. Containers 38 and 40 for washing liquid and teat spray respectively are provided in the housing 12 which also contains a pump and other components of the machine which are not available in FIG. 1.

FIG. 2 illustrates the milking machine of FIG. 1 diagramatically. The milking machine includes an electrically driven pump 18 having a partial vacuum inlet 19 and a high pressure outlet 20. When vacuum is required the outlet is opened to atmosphere and when high pressure is required, the inlet is opened to atmosphere. The pump is of the dry air type which does not rely on oil in its operation other than for lubrication or bearings. The electric motor driving the pump is of a small rating, for example, approximately 0.25 Kw. Such a motor may be of a single-phase electrical supply type to facilitate connecting the machine to an electrical supply point.

Both the inlet and outlet sides of the pump 18 are connected to an upper region of the milk recording jar 15 through a three-way valve 22, the inlet 19 being connected to the valve 22 via a moisture trap 24. The suction side of the pump 18 is also connected to a pulsator unit 26, which can be pneumatically, mechanically or electrically operated in a known manner and which is connected to teat cup housings 28 of the cluster 17 through separate tubes 29 which enable each teat cup of the cluster to be activated to effect milking in the usual way.

A milk conveying flexible tube 30 connects the teat cup cluster 17 with an upper region of the milk recording jar 15 through a milk inlet valve 32. The bottom of the milk recording jar has an outlet with a valve 34 and a coupling 36 which may be coupled to a milk storage vessel through a suitable pipeline, not shown.

An upper region of each of the containers 38 and 40 communicates selectively by way of a three-way valve 42 with either the suction or high pressure sides of the pump 18. The high pressure connection includes a check valve 44 and a three-way valve 46 which includes a controlled opening to atmosphere. Each of the containers 38 and 40 had an outlet 48 and 50 terminating in a hand operable spray gun 52 and 54, respectively. Also each of the containers 38 and 40 has a check valve or hand valve controlled inlet 56 and 58 for drawing in wash liquid and teat spray, respectively. The wash liquid container 38 has upper and lower regions both connected to a three way valve 60 which is also connected to the milk conveying tube 30 at a position between the valve 32 and cluster 17. The diagram of FIG. 2 shows separate entries into each of the containers 38 and 40 for the various fluid lines. In practice, however, there may be a single opening in the top of each container with two tubes inserted through this opening, one tube terminating in an upper region of the container and the other in a lower region thereof with the fluid lines being connected to the tubes outside the container. The same may apply to the milk recording jar 15.

The teat cup cluster 17 is of the type including an air bleed inlet to a chamber communicating with the four teat cups so that milk is conveyed through the milk conveying tubes to the recording jar with a continuous flow of air entering the chamber.

The operation of the machine is now described.

First, a cow to be milked has its teats and udder washed. The washing liquid container 38 is used for this purpose. With the pump 28 running, a valve 19a on the inlet to the pump or the milk valve 32 is opened, the valve 22 to the milk recording jar 15 is closed, the valve 46 is opened to the check valve 44 and closed to atmosphere, and the valve 42 is moved to connect the check valve 42 to the containers 38 and 40. Both containers will now be pressurised. The valve 60 is closed. Washing liquid can now be sprayed through the nozzle 52 on to cows udders.

Secondly, milking commences. This is done by opening the high pressure side of the pump to atmosphere through the valve 46 while the suction side of the pump 18 is connected to the recording jar through the valve 22. The milk inlet valve 32 is opened to apply vacuum to the cluster 17 which is fitted to the cow. The cows milked by the application of vacuum and the action of the pulsator unit 26. Milk flows through the tube 30 into the milk recording jar 15. The milk inlet to the recording jar is designed to cause the milk to flow down the walls to avoid unnecessary splashing or agitation of the milk which is considered to be detrimental.

After milking has been completed the valve 32 is closed and the milk in the recording jar is expelled by moving the valve 22 to connect the high pressure side of the pump to the interior of the milk recording jar and by closing the valve 46 and opening the valve 34.

Finally, the parts of the machine in contact with the cow and milk are cleaned. This is done by closing the valve 22, moving the valve 46 to connect high pressure air to the containers 38 and 40 with the valve 42 connecting the containers 38 and 40 through the check valve 44 to the high pressure side of the pump, so that high pressure is introduced into both of the containers 38 and 40. The valve 60 is moved to connect the bottom of the washing liquid container 38 to the milk conveying tube 30 so that washing fluid is forced through this tube 30 and teat cup cluster as well as the biased inlet mentioned above. The milk recording jar can also be flushed by opening the valves 32 and 34, the coupling 36 being disconnected from the milk line.

After washing with cleaning fluid the valve 60 is reversed to connect the upper region of the container 38 to the milk conveying tube 14 so that compressed air is blown through the tubes and teat cup cluster to remove the washing liquid itself. The valve 60 is then closed.

With the valves 46 and 42 in the positions described immediately above the teats and udder of a cow just milked can be sprayed with teat spray from container 40. The milking machine is now also ready for milking a subsequent cow, starting from washing the cows udders and teats as described above. Warm wash liquid is used as this stimulates the cow to release milk. In this respect warm liquid is introduced into the containers 38 and 40 which are of insulated material and are in the housing 12. If required additional insulating material may be provided in the housing.

The vacuum of the pump 18 is also used for drawing wash liquid and teat spray into the container 38 and 40, respectively, this being done when milking is not being carried out so as to avoid fluctuations in the vacuum applied to the teat cluster 17. For this drawing in of liquid, the valve 42 is set to connect the pump inlet 19 to these containers. The valves 56 and 58 are open as required.

FIG. 3 shows another arrangement of milk recording jar 100, teat cluster 101, pulsator 103, containers 102 and 104, pump 130, liquid trap 131 and valves 106 to 118 which are solenoid operated valves all connected to a switch assembly 122. The switch 122 has three positions, namely, position 124 for pressurisation of the cleaning fluid containers 102 and 104, position 126 for milking; and position 128 for milk transfer out of the recording jar. The electrical connections between the switch 122 and the solenoid valve has not been shown as this will be apparent to skilled persons.

The valves 106, 108 and 109 controlling the inlet 132 and outlet 134 of the compressor to the milk recording jar 100 are normally open solenoid valves so that, if energisation of either valve fails, milking can nevertheless proceed. The valves 110, 111 and 112 for controlling the high pressures applied to the milk recording jar 100 and the cleaning fluid containers 102 and 104 are of the normally closed type as are the valves 114, 116 and 118 controlling the high pressure supply of air and water for cleaning purposes as well as the vacuum to the cleaning fluid containers 102 and 104. A milk inlet valve 120 is a manually operated valve, as a solenoid operated valve for milk is extremely costly. The valve 120 could also be solenoid operated, however.

The electrically controlled machine operates substantially in the same way as that described for the machine of FIGS. 1 and 2, with the benefit of the convenience of having the valves selectively and automatically operated in the appropriate position of the switch 122.

The invention is not limited to the precise constructional details described above and various modifications may be made to the milking machines without departing from the spirit and scope of this invention. For example the machine unit 10 could be wall mounted or free standing i.e. without wheels. Also the teat spray container and applicator spray gun could be omitted if required. Also the outlet valve for milk from the recording jar could be a simple check valve. One particularly advantageous modification which is is envisaged is the incorporation of the valves described above into a suitable unit including a single multi-port valve which could be of the spool valve type, operation of which selectively controls all the required valve functions. Another modification is to use separate pumps for partial vacuum and high pressure. Furthermore for milking two cows at the same time two pumps each having high pressure and partial vacuum sides can be used; this construction prevents fluctuations in vacuum applied to either cow during milking.

A modification of the FIG. 3 embodiment includes connecting groups of solenoid valves to individual switches, such as push button switches to control the electricity supply to these valves to effect backwashing of the milk tube, cluster and air bleed and the drying out thereof with compressed air.

Certain advantageous features of the embodiments described above are as follows. Firstly the machine is of a small size using a low cost pump and motor, the pump being of a dry air type and the motor being of a single phase type which can be connected to any convenient supply point. The pump is located close to the milk receiving jar and the teat cluster so minimising frictional losses in the vacuum and pressure line and minimising leakages into the vacuum system. From this construction flows the benefit that the motor and pump can be relatively small and inexpensive because the requirement for reserve capacity of the pump are minimised. The components are simple so ensuring easy maintenance and low cost. The milking unit requires no expensive plumbing and skilled labour for installation and the machine may be tested at the factory, so that all a farmer is required to do is to plug in his machine and use it immediately. The construction of the machine also provides efficient cleaning of the milk recording jar, teat clusters and tubing in contact with the milk. The fact that the machine services one cow only at a time ensures that there are no significant vacuum fluctuations which are believed to be one cause of mastitis.

I claim:

1. A milking machine comprising:
   (a) a pneumatic pump having an outlet port and an inlet port;
   (b) a teat cluster,
   (c) a milk receiver,
   (d) a milking line connecting the teat cluster to the milk receiver to convey milk from the teat cluster to the milk receiver,
   (e) a suction line leading to the inlet port,
   (f) a pressure line leading from the outlet port,
   (g) a first valve to which the suction and pressure lines are connected and which is connected to the milk receiver, the first valve being adjustable to connect either the suction line or the pressure line to the milk receiver,
   (h) a discharge line leading from the milk receiver and having means whereby it may be connected to a storage vessel,
   (i) suction valve means in the suction line movable to an open position in which it connects the suction line to atmosphere,
   (j) outlet valve means in the pressure line movable to an open position in which it connects the pressure line to atmosphere, and
   (k) control valves in the milking and discharge lines for respectively opening or closing such lines.

2. A machine as claimed in claim 1 further comprising a cleaning line operatively connected at its one end to the pressure line and at its other end to the teat cluster, at least one container adapted to contain a cleaning liquid and being connected to the cleaning line intermediate its ends, and a second valve in the cleaning line for selectively opening or closing the cleaning line.

3. A machine as claimed in claim 2 further comprising a spray gun and conduit means leading from the container to the spray gun.

4. A machine as claimed in claim 2 further comprising a cleaning fluid intake line connected at its one end to the suction line and connectable at its other end to a cleaning liquid source, the container being located intermediate the ends of the cleaning fluid intake line, and a fourth valve in the cleaning fluid intake line for selectively opening or closing the cleaning fluid intake line.

5. A machine as claimed in claim 2 wherein the second valve is located in the cleaning line downstream of the container.

6. A machine as claimed in claim 5 further comprising a milk receiver cleaning line connecting the container to the milk receiver, and a third valve in the milk receiver cleaning line for selectively opening or closing the milk receiver cleaning line.

* * * * *